United States Patent
Beichl et al.

(10) Patent No.: US 9,759,077 B2
(45) Date of Patent: Sep. 12, 2017

(54) METHOD FOR FASTENING A BRUSH SEALING ELEMENT IN A GROOVE OF A HOUSING SEGMENT

(75) Inventors: Stefan Beichl, Herrsching (DE); Erhan Uecguel, Berlin (DE)

(73) Assignee: MTU Aero Engines GmbH, Munich (DE)

( * ) Notice: Subject to any disclaimer, the term of this patent is extended or adjusted under 35 U.S.C. 154(b) by 922 days.

(21) Appl. No.: 13/700,687

(22) PCT Filed: Apr. 29, 2011

(86) PCT No.: PCT/DE2011/000459
§ 371 (c)(1),
(2), (4) Date: Feb. 15, 2013

(87) PCT Pub. No.: WO2011/147395
PCT Pub. Date: Dec. 1, 2011

(65) Prior Publication Data
US 2013/0202419 A1  Aug. 8, 2013

(30) Foreign Application Priority Data
May 28, 2010  (DE) .................. 10 2010 021 923

(51) Int. Cl.
*F01D 11/00* (2006.01)
*F16J 15/3288* (2016.01)

(52) U.S. Cl.
CPC ......... *F01D 11/001* (2013.01); *F16J 15/3288* (2013.01); *Y10T 29/49297* (2015.01)

(58) Field of Classification Search
CPC .. F16J 15/3268; F16J 15/3288; F01D 11/005; F01D 11/02; F01D 11/025; F01D 11/001
See application file for complete search history.

(56) References Cited

U.S. PATENT DOCUMENTS

| 4,730,876 A | 3/1988 | Werner et al. |
| 7,290,769 B2 * | 11/2007 | Plona .................... F01D 11/003 277/355 |

(Continued)

FOREIGN PATENT DOCUMENTS

| DE | 36 06 284 A1 | 2/1987 |
| DE | 100 18 273 A1 | 10/2001 |

(Continued)

OTHER PUBLICATIONS

PCT/DE2011/000459 PCT/ISA/210, dated Oct. 12, 2011, 3 pages.
German Search Report, dated Jan. 5, 2011, 6 pages.

*Primary Examiner* — Justin Seabe
(74) *Attorney, Agent, or Firm* — Crowell & Moring LLP

(57) ABSTRACT

A sealing system and method is disclosed. The sealing system includes a brush sealing element and an accommodating element with an accommodating chamber. The brush sealing element is disposed in the accommodating chamber and a bendable strap is disposed on the accommodating element. The method includes fastening the brush sealing element in the accommodating chamber of the accommodating element. The accommodating element is arranged in a groove of a housing segment and a position of the accommodating element is secured on the housing element by bending the strap of the accommodating element to engage with a side wall of the housing segment.

20 Claims, 1 Drawing Sheet

(56) References Cited

U.S. PATENT DOCUMENTS

| | | |
|---|---|---|
| 2002/0020968 A1 | 2/2002 | Gail et al. |
| 2005/0040602 A1 | 2/2005 | Beichl et al. |
| 2009/0072486 A1* | 3/2009 | Datta .................. F16J 15/3288 |
| | | 277/355 |
| 2009/0092485 A1* | 4/2009 | Bridges, Jr. ........... F01D 11/008 |
| | | 415/173.7 |

FOREIGN PATENT DOCUMENTS

| | | | |
|---|---|---|---|
| DE | 101 63 804 A1 | 7/2003 | |
| DE | 103 37 867 A1 | 3/2005 | |
| DE | 102004024080 A1 * | 12/2005 | ............ F01D 11/001 |
| EP | 1 890 056 A1 | 2/2008 | |
| EP | 1 990 056 A1 | 11/2008 | |
| EP | 1 998 090 A2 | 12/2008 | |
| GB | 2 315 302 A | 1/1998 | |

* cited by examiner

METHOD FOR FASTENING A BRUSH SEALING ELEMENT IN A GROOVE OF A HOUSING SEGMENT

This application claims the priority of International Application No. PCT/DE2011/000459, filed Apr. 29, 2011, and German Patent Document No. 10 2010 021 923.1, filed May 28, 2010, the disclosures of which are expressly incorporated by reference herein.

BACKGROUND AND SUMMARY OF THE INVENTION

The invention relates to a method for fastening a brush sealing element in a groove of a housing segment for a thermal turbomachine, in particular for a gas turbine. The invention also relates to a sealing system as well as an accommodating element for such a sealing system.

There are a number of application cases in which two parts such as a stator and a rotor rotating relative to one another are to be sealed non-hermetically with respect to one another. Such an application case includes, for example, sealing an annular gas-flow gap between the housing and the rotor of a thermal turbomachine, for example, a gas turbine for an aircraft. Brush seals are often used for non-hermetic sealing of annular interspaces between components rotating in relation to one another because brush seals are lighter and more compact than labyrinth seals while achieving the same sealing effect. Using brush seals therefore permits optimization of the structural design of rotors and housings. Reducing installation space in this way achieves significant savings in costs and weight, especially in engine design.

German Patent Document No. DE 103 37 867 A1 discloses a sealing system using a brush sealing element formed by multiple bristles, which are twisted around a core element and are secured on the core element via a clamping ring. The unit comprised of a clamping ring, a core element and bristles is arranged in a so-called bristle housing, which is formed by a supporting element embodied as a supporting ring and by a cover element embodied as a cover ring. The cover ring protects the brush sealing element from direct oncoming flow and foreign bodies, while the supporting ring ensures the required hold. Thanks to their elasticity, the bristles can compensate for axial and radial movements of the rotor because they can be pressed away and then return to their original positions. During operation of a respective turbomachine, the tips of the bristles lie on a sealing surface and force the oncoming gases to flow through the bristle package of the brush sealing element. This gas flow forces the bristle package against the supporting ring, causing the bristle package to form a seal. The clearances between the bristles are closed in this process and the gas permeability is reduced to a minimum. This creates a non-hermetic barrier for the gas flow. The multipart bristle housing is inserted into a groove in the housing segment for a turbomachine for assembly purposes or is bolted to the housing segment. Several housing segments can then be joined to form one housing.

The object of the present invention is to create a simple and inexpensive possibility for connecting a brush sealing element to a housing segment. Another object is to supply a sealing system, which can be manufactured easily and inexpensively.

These objects are achieved according to this invention by a method for securing a brush sealing element in a groove of a housing segment for a thermal turbomachine, a sealing system and by an accommodating element for such a sealing system. Advantageous embodiments with expedient refinements of the invention are described in the respective dependent claims, where advantageous embodiments of the method are to be regarded as advantageous embodiments of the sealing system and/or of the accommodating element and vice versa.

In a method according to the invention for securing a brush sealing element in a groove of a housing segment for a thermal turbomachine, in particular for a gas turbine, the steps performed include at least securing the brush sealing element in an accommodating chamber of a one-piece accommodating element, arranging the accommodating element in the groove of the housing segment and securing the position of the accommodating element on the housing segment. Although insertion of the brush sealing element into the groove of the housing segment as was customary in the past did not reliably secure the brush sealing element in position during the further assembly, bolting and mortising as in the previous alternative are comparatively tedious and complex methods associated with high costs accordingly. With the help of the method according to the invention in contrast with the prior art, the brush sealing element can be rapidly, easily and inexpensively secured in position on the housing segment by means of the one-piece accommodating element, thereby permitting substantial time and cost savings.

In an advantageous embodiment of the invention, it is provided that the brush sealing element is secured in the accommodating chamber in a form-fitting manner, in particular by locking, and/or in a force-locking manner, in particular by clamping, and/or in a physically bonded manner, in particular by adhesive bonding. The brush sealing element may be secured in the accommodating chamber in an especially flexible manner in this way. In addition, the accommodating element and the brush sealing element may be adapted geometrically to one another, such that the brush sealing element can be secured in the accommodating chamber of the accommodating element without the use of tools and therefore especially easily and quickly.

Additional advantages are derived by first inserting the brush sealing element into the accommodating chamber of the accommodating element, after which at least one clamping element of the accommodating element is bent toward a clamping tube of the brush sealing element in such a way that the brush sealing element is secured in the accommodating chamber of the accommodating element. In this way, the clamping tube, which forms the "head" of the brush sealing element, is secured with respect to the accommodating element on the one hand, while on the other hand, the brushes protruding away from the clamping tube are still movable, so that they can be pressed away during operation of a respective turbomachine and then can assume their original position again.

In another advantageous embodiment of the invention, it is provided that for securing the position of the accommodating element on the housing segment, at least one strap of the accommodating element protruding out of the groove is bent toward a wall of the housing segment. This is a possibility that is especially simple and fast for securing the position of the accommodating element and thus of the brush sealing element on the housing segment. In the next assembly of multiple housing segments, the bent straps are clamped between neighboring housing segments, thereby achieving an especially stable, long-lasting and easy means of securing the position of each brush sealing element in a simple manner.

Another aspect of the invention relates to a sealing system for a housing segment of a thermal turbomachine, in particular a gas turbine, wherein the sealing system comprises at least one brush sealing element, which is secured in position in a groove of the housing segment. According to the present invention, it is provided that the brush sealing element is secured in an accommodating chamber of a one-part accommodating element, and the accommodating element is secured in place in the groove of the housing element. This creates a sealing system, which can be manufactured especially easily and inexpensively. Additional advantages resulting in this way can be derived from the preceding description, where advantageous embodiments of the method are regarded as advantageous embodiments of the sealing system and vice versa.

Additional advantages are obtained in that the sealing element has at least one strap, which is bent against the wall of the housing segment in a lateral end area of the groove. Structurally this is an especially simple, fast and reliable possibility for indirectly securing the position of the brush sealing element on the housing segment.

In another advantageous embodiment of the invention, it is provided that the accommodating element comprises at least one clamping element, in particular a clamping lug, by means of which the brush sealing element is secured in the accommodating chamber of the accommodating element. This is an especially fast, simple and inexpensive possibility for securing the brush sealing element in the accommodating element.

Another aspect of the invention relates to an accommodating element for a sealing system according to any one of the preceding exemplary embodiments, wherein the accommodating element comprises an accommodating chamber for securing a brush sealing element in the accommodating element and having an external geometry that is adapted to the geometry of a groove in a housing segment of a thermal turbomachine, in particular a gas turbine. The accommodating element, according to the invention, is thus a simple and inexpensive possibility for connecting a brush sealing element to a housing segment, because the brush sealing element is merely secured in the accommodating element, and then its position can be secured in the groove of the housing element by means of the accommodating element. The accommodating element may therefore have an external geometry with a certain excess dimension in comparison with an internal contour of the groove for this purpose, so that the accommodating element can be pressed into the groove. Alternatively, it is possible to provide for the external geometry of the accommodating element to correspond at least essentially to the internal contour of the groove. Additional features and their advantages which definitely result from this can be derived from the preceding descriptions, wherein advantageous embodiments of the method according to the invention and of the sealing system according to the invention are to be regarded as advantageous embodiments of the accommodating element and vice versa.

Additional advantages are obtained when the accommodating element is embodied with a U-shaped cross section in at least some areas. In this way, for example, a clamping tube of the brush sealing element may be secured in the corresponding U-shaped accommodating chamber by clamping it while the bristles of the brush sealing element are still movable within the accommodating chamber in relation to the accommodating element.

In another advantageous embodiment of the invention, it is provided that opposing walls of the accommodating element have different wall areas and/or wall heights. One wall can therefore protect the brush sealing element from oncoming flow and foreign bodies during operation of a respective turbomachine, while the opposite wall supports the bristles of the brush sealing element in the direction of flow.

The accommodating element may be manufactured especially inexpensively from a metal and/or a metal alloy, in particular from a metal plate. The ductility of metals and/or metal alloys makes it possible to secure the brush sealing element in the accommodating chamber of the accommodating element by clamping it in an especially simple manner. In addition, when using a metallic material, the accommodating element can be secured in position especially quickly and easily by bending it on the housing segment. Through a suitable choice of the metal and/or the metal alloy, the properties of the accommodating element—for example, with regard to thermal stability, corrosion resistance and the like—may be adjusted in a targeted manner.

In another embodiment, it is provided that the accommodating element comprises at least one clamping element, in particular a clamping lug, by means of which the brush sealing element can be secured in the accommodating chamber. The brush sealing element can be secured especially quickly and easily by clamping it in the accommodating chamber in this way.

Since the accommodating element comprises multiple clamping elements spaced a distance apart from one another, the brush sealing element may be clamped at several locations and can be secured in the accommodating chamber in an especially reliable manner.

In another embodiment, it is provided that at least one clamping element has a geometry adapted to a cross-sectional geometry of a clamping tube of the brush sealing element. On the one hand, the clamping tube of the brush sealing element can be reliably secured in the accommodating chamber in this way, while on the other hand, the bristles of the brush sealing element are still movable and may compensate for axial and radial rotor movements during operation in a respective turbomachine.

The accommodating element may be secured in its position on the housing segment especially quickly, easily and inexpensively, if it comprises at least one side strap for contact with a wall of the housing segment. It is also possible to provide here that the accommodating element comprises two or more straps, which may be used to secure the position of the accommodating element on the housing segment by simply bending it over.

Additional features of the invention are derived from the claims, the exemplary embodiment and the drawings. The features and combinations of features mentioned in the description as well as the features and combinations of features mentioned below in the exemplary embodiment may be used not only in the respective combination given but also in other combinations or even alone, without going beyond the scope of the present invention.

DETAILED DESCRIPTION OF THE DRAWINGS

Figure 1:
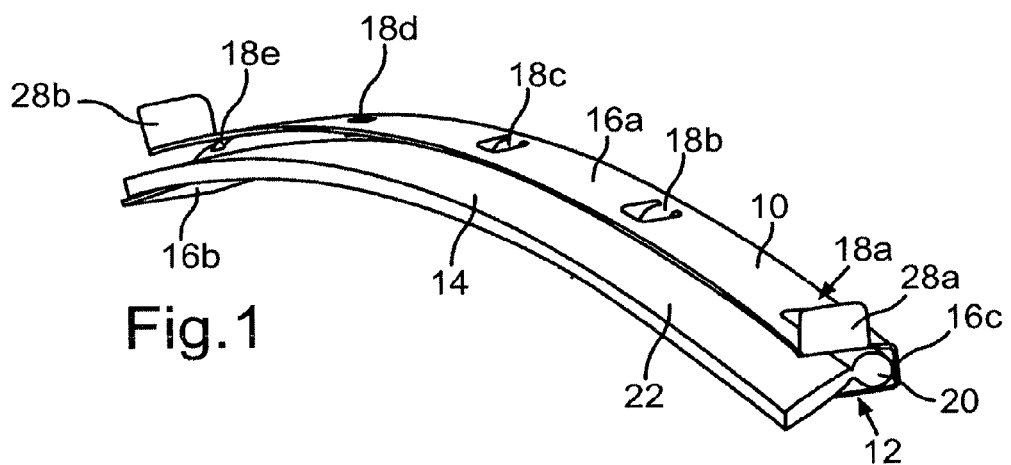
FIG. 1 shows a schematic perspective view of an accommodating element in whose accommodating chamber a brush sealing element is secured.

FIG. 1 shows a schematic perspective view of an accommodating element 10, in whose accommodating chamber 12 a brush sealing element 14 is secured. The one-piece accommodating element 10 is embodied with a U-shaped cross section and consists of a metal plate. The opposite walls 16a, 16b of the accommodating element 10 have different wall heights. The wall 16a comprises multiple clamping elements 18a-e, which are spaced a distance apart from one another and by means of which the brush sealing element 14 is secured by clamps in the accommodating chamber 12. The clamp elements 18a-e are produced by punching them out in the present case and are embodied as clamping lugs, which have a geometry that is adapted to the cross-sectional geometry of the clamping tube 20 of the brush sealing element 14. The brush sealing element 14 is known as such in the prior art and comprises bristles 22, which are wound around a core element (not shown) and are affixed to the core element by means of the clamping tube 20. The clamping elements 18a-e press the clamping tube 20 against a rear wall 16c of the accommodating element 10, thereby securing the brush sealing element 14 in the accommodating chamber 12. Instead of the brush sealing element 14 shown here, brush sealing elements 14 with a different design may fundamentally also be used.

The clamping elements 18a-e may fundamentally be pre-bent, so that the brush sealing element 14 can be pressed into the accommodating chamber 12 in the manner of a lock engagement by pressing it against the resistance of the clamping elements 18a-e and securing it on the accommodating element 10. Alternatively or additionally, it is possible to provide that some or all clamping elements 18a-e will first be flush with the wall 16a and/or will at least not protrude into the accommodating chamber 12 and will be bent over only after insertion of the brush sealing element 14.

The accommodating element 10 additionally comprises side straps 28a, 28b, which are arranged at the ends of the wall 16a in the present example and whose precise function is explained in greater detail below. Alternatively or additionally, it is possible to provide that at least one strap 28 is arranged on the wall 16b. In addition, it is possible to provide that at least one strap is formed on a front end area of the wall 16a and/or of the wall 16b.

Figure 2:
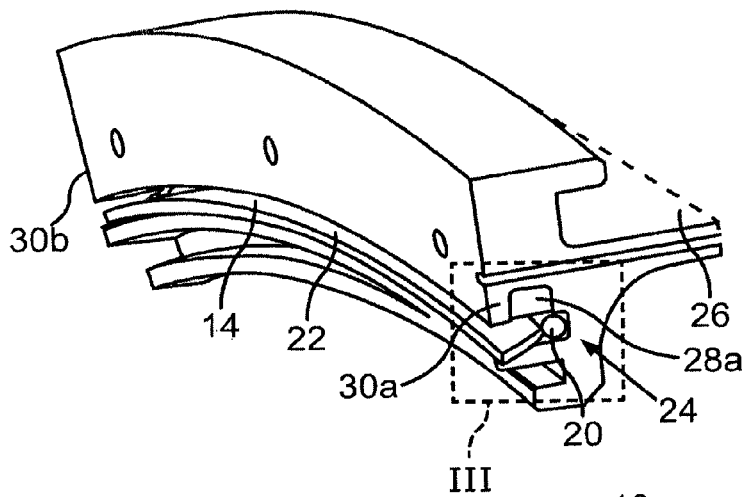
FIG. 2 shows a schematic perspective view of a housing segment in whose groove the brush sealing element shown in FIG. 1 is secured in position by means of the accommodating element.

FIG. 2 shows a schematic perspective view of the housing segment 26 in whose groove 24 the brush sealing element 14 shown in FIG. 1 is secured in its position by means of the accommodating element 10. To this end, the accommodating element 10 is inserted into the groove 24 after the brush sealing element 14 has been secured thereon with the help of the clamping elements 18a-e as shown in FIG. 1 and is also secured in position by bending the straps 28a, 28b over on the side walls 30a, 30b of the housing segment 26. This allows a particularly simple and inexpensive installation of the brush sealing element 14 in the housing segment 26. The housing segment 26 may then be joined to additional housing segments 26 to form a finished housing (not shown) of a gas turbine as part of the subsequent assembly steps. Then the straps 28a, 28b are clamped between the adjacent walls 30a, 30b of neighboring housing segments 26, thereby achieving a further improvement in securing of the position of the brush sealing element 14.

Figure 3:
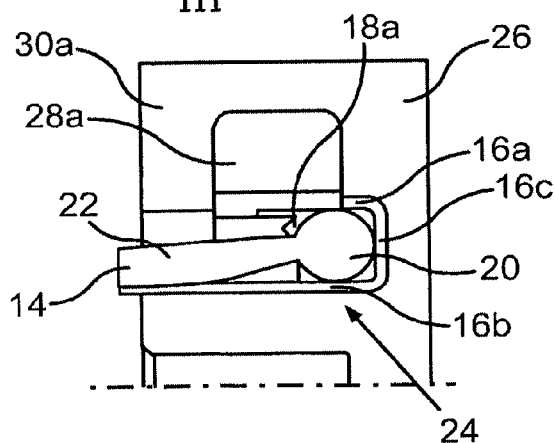
FIG. 3 shows a schematic side view of the detail III shown in FIG. 2.

FIG. 3 shows a schematic side view of the detail III shown in FIG. 2 for further illustration. This shows especially well the clamping tube 20 in particular, which is secured through the clamping element 18a arranged in the area of the strap 28a. In addition, it can be seen here that the wall 16a of the U-shaped accommodating element 10 has a smaller wall height than the wall 16b opposite it. The bristles 22 can also move within the accommodating chamber 12 and/or the groove 24 of the housing segment 26. During operation of a respective turbomachine, radial rotor movements can therefore be compensated due to the flexibility of the inclined bristles 22. The gas film which develops between the tips of the bristles 22 and the respective sealing surface ensures operation that is almost free of wear.

The invention claimed is:

1. A sealing system, comprising:
   a brush sealing element; and
   a one-piece accommodating element with an accommodating chamber, wherein the brush sealing element is disposed in the accommodating chamber, wherein the accommodating element has a wall with a first bent strap and a second bent strap, and wherein the first bent strap and the second bent strap are disposed on opposite circumferential ends of the wall of the accommodating element.

2. The sealing system according to claim 1, wherein the accommodating element includes at least one clamping element and wherein the at least one clamping element is engageable with the brush sealing element.

3. The sealing system according to claim 1, wherein the accommodating element has a U-shaped cross-section at least in a portion of the accommodating element.

4. The sealing system according to claim 1, wherein the wall and an adjacent wall of the accommodating element have different wall areas and/or wall heights.

5. The sealing system according to claim 1, wherein the accommodating element is comprised of a metal and/or a metal alloy.

6. The sealing system according to claim 1, wherein the accommodating element includes a plurality of clamping elements and wherein the plurality of clamping elements are spaced a distance apart from another.

7. The sealing system according to claim 6, wherein the brush sealing element includes a clamping tube and wherein at least one of the plurality of clamping elements has a geometry that is adapted to a cross-sectional geometry of the clamping tube.

8. The sealing system according to claim 1 in combination with a housing segment of a turbomachine:
   wherein the housing segment includes a groove;
   wherein the accommodating element is disposed within the groove;
   and wherein the first bent strap and the second bent strap engage with respective side walls of the housing segment.

9. The sealing system according to claim 8 in combination with a second housing segment of the turbomachine, wherein the second housing segment is adjacent to the housing segment, wherein one of the first bent strap and the second bent strap is disposed between the respective side wall of the housing segment and a side wall of the adjacent second housing segment.

10. The sealing system according to claim 8, wherein the accommodating element has an external geometry which is adapted to a geometry of the groove of the housing segment.

11. The sealing system according to claim 8, wherein the turbomachine is a gas turbine.

12. The sealing system according to claim 8, wherein the accommodating element includes at least one clamping element and wherein the at least one clamping element is engageable with the brush sealing element.

13. The sealing system according to claim 8, wherein the accommodating element has a U-shaped cross-section at least in a portion of the accommodating element.

14. The sealing system according to claim 8, wherein the wall and an adjacent wall of the accommodating element have different wall areas and/or wall heights.

15. The sealing system according to claim 8, wherein the accommodating element is comprised of a metal and/or a metal alloy.

16. The sealing system according to claim 8, wherein the accommodating element includes a plurality of clamping elements and wherein the plurality of clamping elements are spaced a distance apart from another.

17. The sealing system according to claim 16, wherein the brush sealing element includes a clamping tube and wherein at least one of the plurality of clamping elements has a geometry that is adapted to a cross-sectional geometry of the clamping tube.

18. A method of fastening a brush sealing element in a groove of a housing segment of a turbomachine, comprising the steps of:
   fastening the brush sealing element in an accommodating chamber of a one-piece accommodating element, wherein the accommodating element has a wall with a first bendable strap and a second bendable strap;
   arranging the accommodating element in the groove of the housing segment; and
   securing a position of the accommodating element on the housing segment by bending the first bendable strap and the second bendable strap, wherein the first bendable strap and the second bendable strap are disposed on opposite circumferential ends of the wall of the accommodating element, to engage with respective side walls of the housing segment.

19. The method according to claim 18, further comprising the step of engaging a clamping element of the accommodating element with the brush sealing element.

20. The method according to claim 19, further comprising the step of bending the clamping element to engage the brush sealing element.

\* \* \* \* \*